June 24, 1924.  
K. WEKERLE  
COMBINATION AIR BRAKE AND GAS SAVER  
Filed Dec. 4, 1920  2 Sheets-Sheet 2
1,498,859
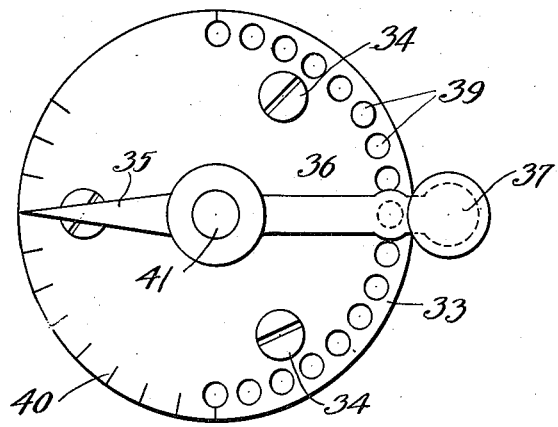
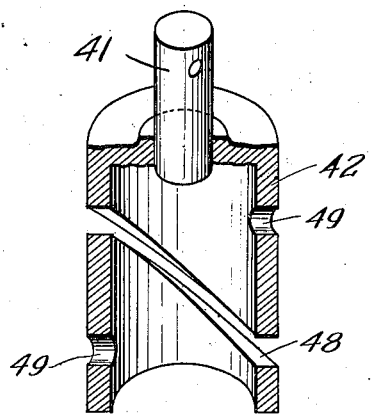
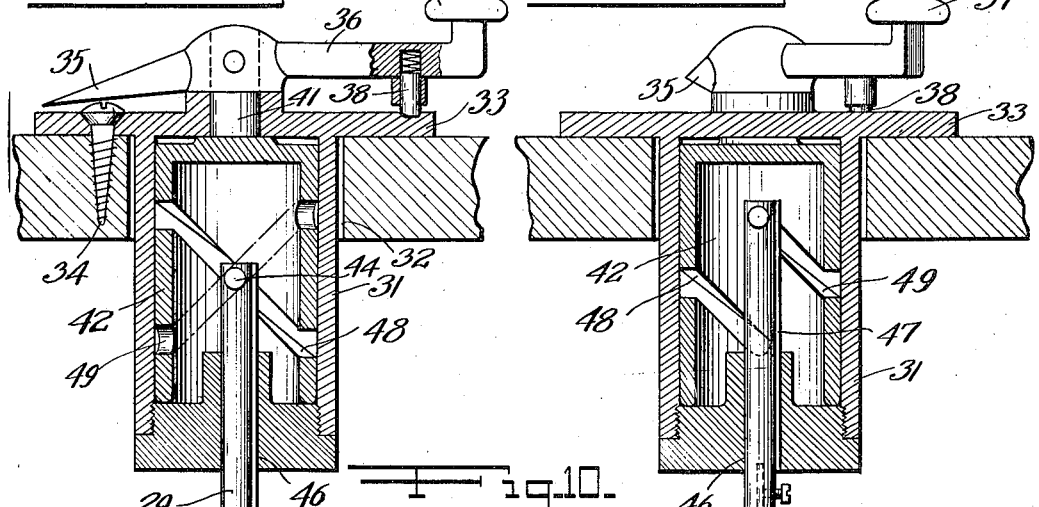
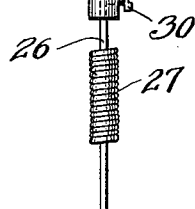
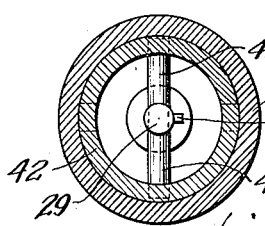

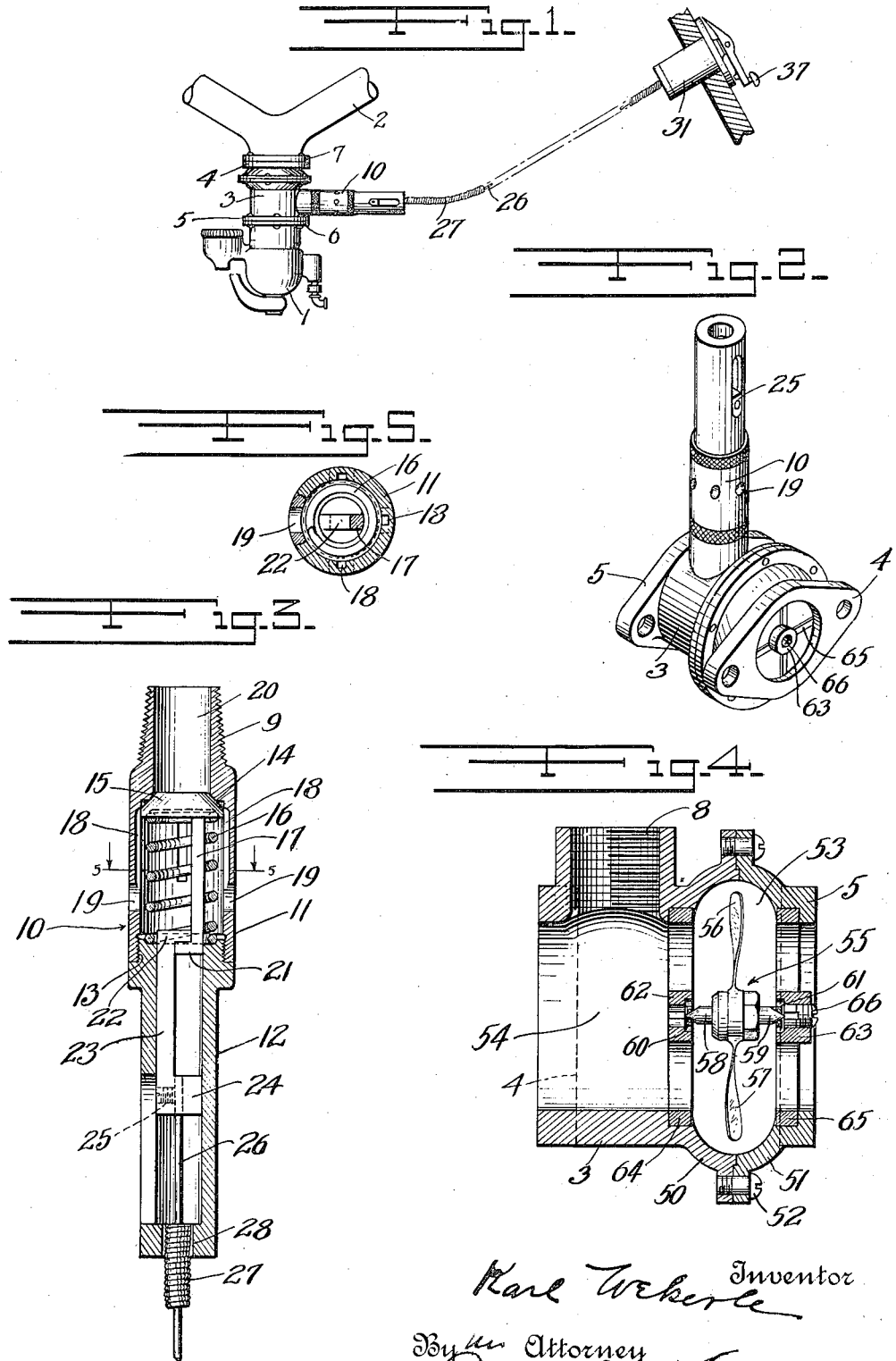

Patented June 24, 1924.

1,498,859

UNITED STATES PATENT OFFICE.

KARL WEKERLE, OF WEST HOBOKEN, NEW JERSEY, ASSIGNOR TO THEODORE STROEHLEN, OF WEST NEW YORK, NEW JERSEY.

COMBINATION AIR BRAKE AND GAS SAVER.

Application filed December 4, 1920. Serial No. 428,403.

*To all whom it may concern:*

Be it known that I, KARL WEKERLE, a citizen of Czechoslovakia, residing in West Hoboken, in the county of Union and State of New Jersey, have invented certain new and useful Improvements in a Combination Air Brake and Gas Saver, of which the following is a specification.

This invention relates to an improved air brake and gas saving apparatus adapted for use upon motor vehicles, and one of the objects of the invention is to provide an apparatus which is exceedingly simple in construction, and yet which operates with great effectiveness for the purposes intended.

Another object of the invention is to produce a gas saving device for the motor of motor vehicles, which may also be operated in such a manner that the engine may be effectively used as a brake for the car.

A further object of the invention is to provide apparatus of the above character, which may be conveniently operated in position at the dash of the car.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claim.

In the accompanying drawings, wherein I have illustrated a preferred form of embodiment of my invention:

Figure 1 is a side view of my improved apparatus.

Figure 2 is a view in perspective of a part thereof.

Figure 3 is a vertical sectional view taken through the part that is adapted to be attached to the manifold of the gas engine.

Figure 4 is a vertical sectional view taken through another part of the apparatus.

Figure 5 is a sectional view taken on line 5—5 of Figure 3.

Figure 6 is a plan view of the dial and operating handle.

Figure 7 is a vertical sectional view taken through the operating means.

Figure 8 is a view similar to Figure 7, but showing the parts in different position; and Figure 9 is a perspective view showing a preferred form of cam means for operating the device.

Figure 10 is a sectional view of the sleeve and its casing.

Referring now to the drawings, wherein similar reference characters refer to similar parts throughout the several views thereof, the reference numeral 1 denotes the usual form of carburetor for a gas engine, and 2 the manifold of such engine to which the carburetor is usually directly connected, in the present instance, however, between the carburetor 1 and the manifold 2 is positioned a casing 3, the construction of which is clearly indicated in Figure 4 of the drawings. This casing 3 has flanges 4 and 5 which are clamped to opposed flanges 6 and 7 respectively, upon the carburetor and manifold, so that the casing forms a chamber or passageway between the two last named parts, through which the explosive mixture.

Leading into the casing 3 is a laterally disposed threaded aperture 8, which is adapted to receive the threaded end 9 of a device 10 which will now be described. This device comprises two tubular sections 11 and 12 respectively, threaded together as at 13. The section 11 is provided with a valve seat 14 against which seats the frustro-conically formed valve 15, which valve is normally urged into engagement with its seat by means of the extensile spring 16, which seats against the valve and against the end of the section 12, said spring encircling a stem 17 attached to the valve. Formed interiorly of the section 11 is a plurality of grooves 18, said grooves extending longitudinally of the section 11 from a position adjacent the valve seat 14, and terminating in the apertures 19 of the section 11, which apertures extend entirely through the wall of said section.

It will be seen that when the valve 15 is in engagement with its seat 14, that the passageway through the device 10 is entirely closed, but that when the valve is moved slightly away from its seat, a fluid can pass through the passageway 20, which leads into the device, thence through the grooves 18, and then through the aperture 19. Likewise when the valve is open, a fluid can pass through the device in the opposite direction.

The valve stem 17 at the end opposite to its attachment with the valve, is provided with a flange or shoulder 21, which is adapted to be engaged with a similarly formed flange or shoulder 22, formed upon one end of the rod 23, which rod is located in the section 12 of the device 10, so as to be able to be reciprocated therein, the interior of the section 10 being so constructed that the valve stem 17 may also be reciprocated therein when the rod 23 is operated to withdraw the valve from its seat, or when the valve 15 is operated by internal pressure; the form of connection between the valve stem 17 and the rod 3 being such as to permit of said last named independent operation of the valve. Moreover, the interior of the section 12 of the device 10 is such that both the valve stem and the rod 23 are guided in their reciprocal movements.

Attached to a block 24, which is fastened to the lower end of the rod 23, as by means of the screw 25, is a wire 26, said wire extending outwardly through the end of the section 12, whence it extends to the operating device presently to be described, which is located upon the dash of the vehicle.

The wire 26 while relatively stiff is nevertheless flexible, said wire preferably extending through a flexible tube 27 made of coiled wire, one end of said tube being located in an aperture 28 provided in the lower part of the section 12, and the opposite end terminating adjacent a rod 29 forming a part of the operating device presently to be described, to which the wire 26 is attached by means of the clamp screw 30. The flexible tube 27, while forming a casing for the wire 26, also prevents any tendency of the wire to buckle when the same is reciprocated endwise to perform its functions.

The reference numeral 31 denotes a casing adapted to extend through an aperture 32 provided in the dash of the car, said casing 31 having a circular flange 33 fastened to the face of the dash, as by means of the screws 34. Said flange forms a dial, over which travels a pointer 35 integrally formed upon a lever 36, the opposite end of which is provided with an operating handle 37. The lever 36 is provided with a downwardly extending spring-pressed pin 38, which is adapted to operate in any one of a series of depression 39 located circumferentially upon the dial 33, which dial as shown may be calibrated as at 40.

The lever 36 is fastened to a shaft 41, which is journalled in the central portion of the flange or dial 33, said shaft being attached to a sleeve 42, rotatably mounted within the casing 31, and said sleeve being seated between the flange or dial 33 and a block 43 threaded in the lower end of the casing 31. It will be seen that a rotated movement of the shaft 41 by the lever 36 when the handle 37 is manipulated, will cause a rotated movement of the sleeve 42. The sleeve 42 is provided with a pair of inclined cam slots adapted to receive pins or studs 44 and 45, carried upon the upper end of the rod 29; the rod 29 extending through an aperture 46, provided centrally of the block 43, said rod being also provided with a key or spline 47, adapted to guide the rod and prevent any rotative movement thereof.

The cam slots 48 and 49 are so disposed in the sleeve 42 that when the latter is rotated, the rod 29 will be reciprocated endwise in the sleeve, thereby compelling an endwise movement of the wire 26, attached to said rod. Moreover, the cam slots 48 and 49 are so disposed in the sleeve that a movement through an arc of 180° of the pointer 35 will, through the rod 29 and the wire 26 and associated parts, compel a movement of the valve 15 from its seat to a position opposite the aperture 19 of the section 18, or assuming the valve to be opened to that position, to permit the valve to move to its seat 14.

Thus it will be seen that a movement of the handle 39 compelling a rotative movement of the sleeve 42, operates to reciprocate the wire 26, which wire in turn, is adapted to withdraw the valve 13 from its seat. It will be noted that when the valve 15 is moved from its seat a communication is established between the aperture 20 of the device 10 and the aperture 19 in the side wall of the section 11 thereof.

Referring now to the casing 3, it will be observed that the same is provided with a lateral extension 50, the same being formed integrally with said casing 3, and 51 indicates a member which is clamped to the part 50 as by means of the clamp screws 52. The parts 50 and 51 form a chamber 53, through which the explosive mixture passes on its way from the carburetor to the manifold, and from the air supplying device 11, the explosive mixture and the air first passing through the chamber 54 formed within the casing 3.

Located within the chamber 53 is a mixing device 55, the same comprising a fan-like structure, having the blades 56 and 57, said device being provided with the pintles 58 and 59, which rest in ball-bearings 60 and 61, the latter being carried by suitable supports 62 and 63, carried by rings 64 and 65, mounted within the casing. An adjusting screw 66 provides a suitable adjusting means for the bearings of the pintles 58 and 59. The blades 56 and 57 are twisted out of the plane of rotation, as shown, so that the passage of the explosive mixture through the chamber 53 will operate to rotate the mixing device 55, whereby the air and carbureted gases passing through the chamber 53 will be more thoroughly mixed before they enter the manifold 2.

Having thus described the construction of this embodiment of my invention, the operation, which should be largely obvious, is substantially as follows:

Assuming the valve 15 to be in engagement with its seat 14, the explosive mixture will be supplied from the carburetor to the manifold through the chambers 54 and 53, the revolution of the mixing device 55 operating to further commingle said explosive mixture being discharged from the carburetor.

The opening of the valve 15 through the rotative movement of the lever 36 by means of the handle 37, will permit air to be discharged into the chamber 54, through the device 11, said air passing through the opening 19, the grooves 18, and the passageway 20. This air will unite with the mixture being discharged from the carburetor, and will be further commingled with said mixture by the operation of the mixing device 55 as said gases pass through the chamber 53. Any desired amount of air may be admitted in this manner, or by the proper mixture, whereby the most economical mixture may at all times be discharged into the manifold of the engine.

When it is desired to utilize the device described as a brake for the car, for instance, when the car is descending an incline, it is merely necessary to open the valve 15, whereby air will be discharged through the aperture 19, the passageways or grooves 18, the passageway 20, thence through the chambers 54 and 53 of the manifold, to the cylinders of the engine, whereby the compression produced by the operation of the pistons will have a braking effect upon the car, assuming, of course, that the engine of the car is connected through the clutch and transmission with the road wheels of the car. The quantity of air admitted this way, of course, determines the amount of braking effort exerted upon the road wheels of the car.

In the event of a back-fire occurring in the engine, the excess pressure will cause such opening of the valve 15, as will permit the escaping of the gases in a reverse direction through the device 11, the gases, of course, escaping, passing through the apparatus in the reverse direction, and escaping through the aperture 19 to the atmosphere.

It will accordingly be seen that I have provided a construction well adapted to attain, among others, each and every object above pointed out, in an exceedingly simple yet efficient manner, since my improved apparatus may be utilized as a gas saver, as a brake, and as a means to take care of backfire, the apparatus operating in an entirely efficient manner to accomplish these various functions. Moreover, the device may be easily manipulated from a position at the dash of the car.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

In a device of the class described, in combination, a chamber mounted to form part of the intake manifold of an engine, a tubular extension projecting from the wall of said chamber, a spring-held valve seated so as to close said extension, longitudinal channels cut in the wall of said extension from a point adjacent said seat and communicating with ports through the wall of said extension, an actuating member slidable in said extension and engaging the stem of said valve, a flexible member extending from said actuating member to the dash board of said vehicle and a helically slotted cylindrical member revolvably mounted on said dash, a pin in the end of said flexible member engaging in said slot, an indicating handle mounted on said cylindrical member and a dial associated with said handle whereby to regulate the seating of said valve and to control the admission of air through said extension into said chamber.

In testimony whereof, I affix my signature in the presence of two witnesses.

KARL WEKERLE.

Witnesses:
EMMA WEINBERG,
W. L. FAIRCHILD.